May 15, 1934.   L. J. SCHLITZER   1,958,865
ARTIFICIAL EYES FOR DOLLS
Filed May 16, 1933
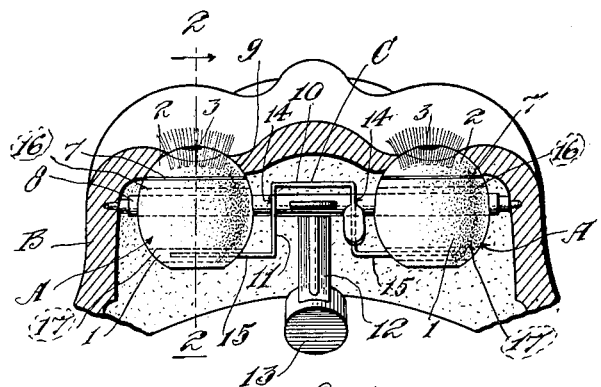
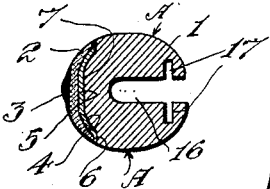
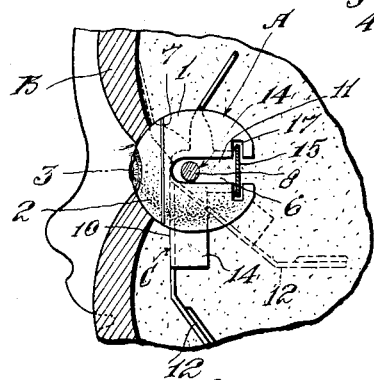
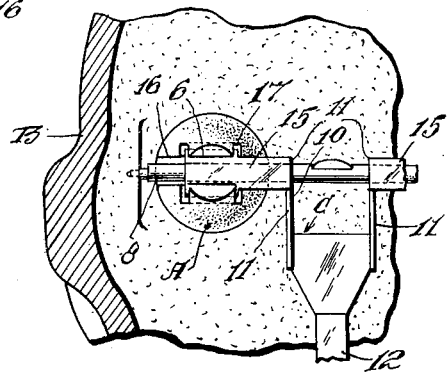
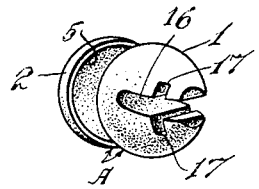
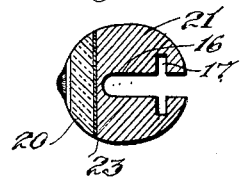
INVENTOR
Leo J. Schlitzer,
BY Harry B. Rook,
ATTORNEY Patented May 15, 1934

1,958,865

UNITED STATES PATENT OFFICE 1,958,865

ARTIFICIAL EYES FOR DOLLS

Leo J. Schlitzer, New York, N. Y., assignor of one-third to Joseph A. Taferner, New York, N. Y., and one-third to Nicholas Popovich, Teaneck, N. J.

Application May 16, 1933, Serial No. 671,292

3 Claims. (Cl. 46—40)

This invention relates to artificial eyes for dolls, display figures and the like, including eye members or balls which are mounted inside the head of the doll or figure to be visible through eye openings and rotate to simulate movement of the eyes, as in opening and closing thereof.

In such constructions, the eye members comprise spherical or hemi-spherical solid or hollow bodies having thereon representations of the pupils of the eyes, and these eye members are mounted on actuating mechanisms which rotate to move the eye members. It has been found that eye members formed of glass are especially desirable because they are more natural in appearance and can be more easily made. However, it is difficult to mold glass eyeballs, and especial difficulty is encountered in making them accurately spherical or hemi-spherical so that they will smoothly rotate in segmental spherical recesses in a doll head. Furthermore, it is very difficult to mount known glass eyeballs on actuating mechanisms because of the smoothness and brittleness of the glass and also because the glass balls easily crack or crush under slight pressure.

One object of my invention is to provide an eye member of the character described embodying novel and improved features of construction including a body of strong substantially non-breakable material, such as wood, having a facing of glass secured thereto in which is formed a representation of the pupil of an eye, whereby the desirable glass simulation of the eye may be obtained and the body of the eye member can be easily mounted on or connected to a mechanism for actuating the eye member.

Other objects are to provide an eye ball of this character wherein the body embodies a novel and improved construction for mounting the eye member on or connecting it to a mechanism for actuating the eye ball, for example actuating mechanism such as shown in Patent No. 1,870,368, dated August 9, 1932, whereby the eye member may be positively rotated and may freely move in any direction to adjust itself to an eye socket in a doll head so as to prevent excessive friction or jamming of the eye member during movement in the socket; and to obtain other advantages and results as will be brought out by the following description.

Referring to the accompanying drawing in which corresponding and like parts throughout the drawing are designated by the same reference characters, Figure 1 is a fragmentary horizontal sectional view through a doll's head showing artificial eyes for dolls embodying my invention.

Figure 2 is a vertical longitudinal sectional view taken on the line 2—2 of Figure 1.

Figure 3 is a rear view of the construction shown in Figure 2.

Figure 4 is a vertical longitudinal sectional view through one of the eye members.

Figure 5 is a composite perspective view of one of the eye members with the two sections separated, and Figure 6 is a vertical sectional view through a modified form of my eye member.

Specifically describing the illustrated embodiment of the invention, the reference character A designates an eye member which is approximately spherical and comprises two complemental segmental sections 1 and 2. The section 1 is preferably formed of some non-breakable material which can be easily shaped, for example, wood, while the section 2 is preferably formed of glass. The section 1 comprises the body of the eye member and is preferably larger than the section 2 which comprises the facing of the eye member.

As shown on the drawing, the facing section 2 is preferably concavo-convex and has a representation of the pupil of an eyeball on the convex side thereof as indicated at 3. This facing section may be made in any suitable manner, according to known processes for manufacturing glass eyeballs for dolls.

The body section 1 has a convex protuberance 4 on its chordal plane surface, said protuberance approximately corresponding in shape to the concave surface 5 of the facing 2. The protuberance is surrounded by a coaxial annular shoulder 6 which is of a diameter approximately corresponding to the diameter of the rim of the facing 2.

In assembling the body part 1 and the facing 2, the facing is applied over the protuberance 4 on the body with the rim of the facing section in abutting relation to the shoulder 6 on the body, and preferably the facing is secured to the body by a layer of adhesive 7 interposed between the concave surface of the facing and the protuberance on the body. The curved surface of the glass facing is thus flush or continuous with the surface of the body part. With such a construction, an eye member 2 having the desired glass representation of the pupil of an eyeball may be provided, and danger of breaking of the glass is reduced. The glass facing 2 is firmly backed by the body part 1, and the adhesive 7 compensates for variations in the shape and irregularities on the concave surface of the facing part 2, so that an exact fit of the glass facing on the body section is not required. The construction also admits of the eye member being easily and quickly mounted upon or connected to a mechanism for actuating the eye member in a doll head.

The eye member may be mounted in a doll head in any suitable manner, but is especially adapted for use with an eye mounting mechanism such as shown in Patent No. 1,870,368 dated August 9, 1932. This mounting mechanism includes a supporting member or bar 8 the ends of which are adapted to be firmly embedded in the side walls of a doll head B in proper relation to eye sockets and openings 9. Upon this support member 8 is mounted a rocker C which comprises a main portion 10 and two pivot legs 11 the planes of which are at substantially right angles to the plane of the main portion 10. At the end of the main portion 10 opposite the pivot legs 11 is a pendulum stem 12 upon which is secured a counter-weight 13. At the outer end of each pivot leg 11 is a pivot opening 14 to receive the supporting member 8, so that the rocker may oscillate upon said supporting member, and projecting at substantially right angles to the pivot legs 11 are spring arms 15 which extend approximately parallel to the supporting member 8.

Each eye member has a slot 16 the plane of which is approximately at right angles to the chordal plane on which the body part 1 and facing part 2 are joined and this slot preferably opens outwardly through the surface of the body part opposite the facing part. In mounting the eye members on the supporting member, the supporting member is slipped into the slots 16 from the open ends thereof whereby the eye members are rotatably mounted on the supporting member. Each eye member also has a slot 17 the plane of which is approximately parallel to said chordal plane upon which the body part and facing part are joined, and also parallel to the axis of rotation of the eye members on the supporting member. These slots 17 are adapted to slidably receive the arms 15 of the rocker so that the rocker, upon rotation thereof upon the supporting member will rotate the eye members, and the eye members may freely move longitudinally of the supporting member and the respective arms 15 to adjust the eye members to the eye sockets 9. Also, preferably the slot 16 is of a width greater than the diameter of the supporting member 8 and the slots 17 are somewhat wider than the arms 15 so that the eye members may move vertically of a doll head to adjust themselves to the eye sockets. The spring arms and the slots 16 also permit the eyeballs to move horizontally in the doll head under the influence of the spring arms to permit further adjustment of the eye members to the eye sockets.

From the foregoing, it will be understood that when the eye members and actuating mechanism are mounted in a doll head the eye members will be yieldingly held in their sockets by the respective spring arms 15, and that the eye members will be rotated upon tilting of the head by oscillation of the rocker and engagement of the spring arms with the slots 17 as indicated by dot and dash lines in Figure 2 of the drawing.

A modification of the eye member is shown in Figure 6 where the glass facing 20 is plano-convex and the chordal plane thereof corresponds in shape and size with the chordal plane of the body part 21. In this construction the convex protuberance 4 is omitted from the chordal plane of the body part 21, and the chordal plane surfaces of the two parts 20 and 21 are connected by a layer of adhesive 23. The construction of the body part 21 is otherwise the same as that of the body part 1, and the eye member may be mounted in the doll head in the same manner as described in connection with the eye member A.

It will be understood by those skilled in the art that representations of eyelashes may be applied to the eye members in any suitable manner, if desired.

While I have shown and described the invention as embodied in certain details of construction it should be understood that this is primarily for illustrating the principles of the invention and that many modifications and changes may be made in the details of construction without departing from the spirit of the invention.

Having thus described my invention, what I claim is:

1. A movable eye construction for dolls, comprising a supporting member to be secured in a doll head, eye members each having a segmentally spherical surface comprising a representation of the pupil of an eyeball and each eye member having an opening parallel to the chordal plane of said segmentally spherical portion through which said supporting member loosely passes to rotatably mount said eye members, each eye member having a slot whose plane is parallel with said chordal plane and said axis of rotation of said eye member, and a rocker oscillatably mounted on said supporting member and having arms each slidably fitted in said slot of one eye member for rotating said eye members and whereby said eye members may freely move longitudinally of said arms.

2. The movable eye construction for dolls set forth in claim 1 wherein said opening in each eye member is a slot lying in a plane at right angles to said chordal plane and opening through the surface of said eye member at a point opposite said segmentally spherical surface.

3. A movable eye construction for dolls, comprising a supporting member to be secured in a doll head, eye members each having a segmentally spherical surface comprising a representation of the pupil of an eyeball, means for rotatably mounting said eye members on said supporting member, each eye member also having a slot whose plane is parallel with said chordal plane and said axis of rotation of said eye member, and a rocker oscillatably mounted on said supporting member and having arms each slidably fitted in said slot of one eye member for rotating said eye members and whereby said eye members may freely move longitudinally of said arms.

LEO J. SCHLITZER.